US012690016B2

(12) United States Patent
Zhou

(10) Patent No.: US 12,690,016 B2
(45) Date of Patent: Jul. 21, 2026

(54) METHOD AND APPARATUS FOR INDICATING SIDELINK COORDINATED RESOURCE, STORAGE MEDIUM, AND TERMINAL

(71) Applicant: BEIJING UNISOC COMMUNICATIONS TECHNOLOGY CO., LTD., Beijing (CN)

(72) Inventor: Huan Zhou, Shanghai (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 434 days.

(21) Appl. No.: 18/156,868

(22) Filed: Jan. 19, 2023

(65) Prior Publication Data

US 2023/0156669 A1 May 18, 2023

Related U.S. Application Data

(63) Continuation of application No. PCT/CN2021/104612, filed on Jul. 6, 2021.

(30) Foreign Application Priority Data

Jul. 29, 2020 (CN) .......................... 202010747168.4

(51) Int. Cl.
*H04W 72/02* (2009.01)
*H04W 72/0446* (2023.01)
(Continued)

(52) U.S. Cl.
CPC ....... *H04W 72/02* (2013.01); *H04W 72/0446* (2013.01); *H04W 72/0453* (2013.01); *H04W 72/25* (2023.01)

(58) Field of Classification Search
None
See application file for complete search history.

(56) References Cited

U.S. PATENT DOCUMENTS

2018/0295646 A1* 10/2018 Faurie ................... H04W 72/23
2019/0053203 A1* 2/2019 Xu ......................... H04W 88/04
(Continued)

FOREIGN PATENT DOCUMENTS

| CN | 110999460 A | 4/2020 |
| WO | 2020/033088 A1 | 2/2020 |
| WO | 2020/060276 A1 | 3/2020 |

OTHER PUBLICATIONS

Extended European Search Report regarding Application No. 21848922.7, dated Dec. 12, 2023.

(Continued)

*Primary Examiner* — Hong S Cho
(74) *Attorney, Agent, or Firm* — Harness, Dickey & Pierce, P.L.C.

(57) ABSTRACT

A method and apparatus for indicating a sidelink coordinated resource, a storage medium, and a terminal are provided. The method includes: receiving a resource coordination request from at least one requesting User Equipment (UE); determining a recommended/non-recommended resource based on the resource coordination request; and transmitting information of the recommended/non-recommended resource to the at least one requesting UE, wherein the information of the recommended/non-recommended resource is carried by Sidelink Control Information (SCI).

17 Claims, 3 Drawing Sheets

~ S101 a coordinating UE receives a resource coordination request from at least one requesting UE, and determines a recommended/non-recommended resource based on the resource coordination request

~ S102 the coordinating UE transmits information of the recommended/non-recommended resource to the at least one requesting UE, to make the at least one requesting UE acquire the recommended/non-recommended resource and determine a resource for transmitting data to another UE

(51) Int. Cl.
    *H04W 72/0453*     (2023.01)
    *H04W 72/25*     (2023.01)

(56)          References Cited

U.S. PATENT DOCUMENTS

| 2019/0182827 | A1* | 6/2019 | Wang | H04W 72/20 |
| 2020/0146044 | A1* | 5/2020 | Maaref | H04W 72/02 |
| 2020/0187163 | A1 | 6/2020 | Lu et al. | |
| 2021/0105760 | A1* | 4/2021 | Chen | H04W 72/0446 |
| 2021/0219268 | A1 | 7/2021 | Li et al. | |
| 2021/0352628 | A1 | 11/2021 | Lee et al. | |
| 2022/0210768 | A1* | 6/2022 | Zhou | H04W 72/20 |
| 2023/0180270 | A1* | 6/2023 | Liu | H04W 72/40 |
| | | | | 370/329 |

OTHER PUBLICATIONS

CATT: "Discussion on resource allocation mechanism in NR V2X", R1-1901995, 3GPP TSG RAN WG1 Meeting #96, Feb. 16, 2019.

Spreadtrum Communications: "Discussion on resource allocation for mode 2", R1-1813085, 3GPP TSG RAN WG1 Meeting #95, Nov. 11, 2018.

Japanese Office Action regarding Application No. 2023-504134, dated Jan. 9, 2024.

"Resource Scheme for UE-to-network Relay UE and remote UE", ZTE Corp., Aug. 2015.

"Discussion on Resource Allocation for NR Sidelink Mode 2", LG Electronics, May 2019.

International Search Report regarding Application No. PCT/CN2021/104612 dated Sep. 28, 2021.

\* cited by examiner

⊗    UE-B

⊖    UE-A

METHOD AND APPARATUS FOR INDICATING SIDELINK COORDINATED RESOURCE, STORAGE MEDIUM, AND TERMINAL

CROSS-REFERENCE TO RELATED APPLICATIONS

This application is a Continuation Application of International Application No. PCT/CN2021/104612, filed on Jul. 6, 2021, which claims priority to Chinese Patent Application No. 202010747168.4, filed on Jul. 29, 2020, both of which are incorporated herein.

TECHNICAL FIELD

The present disclosure generally relates to communication technology field, and more particularly, to a method and apparatus for indicating a sidelink coordinated resource, a storage medium, and a terminal.

BACKGROUND

In 2018, the 80th plenary session of the 3rd Generation Partnership Project (3GPP) passed research projects on 5G New Radio (NR) Vehicle to Everything (V2X). V2X technology includes technologies such as Vehicle-to-Vehicle (V2V), Vehicle-to-Pedestrian (V2P), Vehicle-to-Network (V2N), Vehicle-to-Infrastructure (V2I), and vehicle-to-Everything (V2X), which refers to collecting infrastructure traffic environment information using wireless communication, sensor detection and other technologies, and providing reliable traffic information for vehicle drivers and pedestrians through real-time, efficient, and bidirectional information interaction and sharing between vehicles, between vehicles and pedestrians, and between vehicles and infrastructure, so as to effectively improve safety of infrastructure systems and traffic environment.

SUMMARY

Embodiments of the present disclosure provide a method and apparatus for indicating a sidelink coordinated resource, a storage medium, and a terminal for a V2X. system, which may coordinate resources used for SL communication between UEs to avoid communication delay or failure.

In an embodiment of the present disclosure, a method for indicating a sidelink coordinated resource is provided, including: receiving a resource coordination request from at least one requesting UE; determining a recommended/non-recommended resource based on the resource coordination request; and transmitting information of the recommended/non-recommended resource to the at least one requesting UE, wherein the information of the recommended/non-recommended resource is carried by Sidelink Control Information (SCI).

In an embodiment of the present disclosure, a storage medium having computer instructions stored therein is provided, wherein when the computer instructions are executed, the above method is performed.

In an embodiment of the present disclosure, a UE including the above apparatus or including a memory and a processor is provided, wherein the memory has computer instructions stored therein, and when the processor executes the computer instructions, the above method is performed.

DETAILED DESCRIPTION

As described in the background, during SL communication between UEs in a V2X network, the UE may select an unavailable SL resource, thereby resulting in communication delay or failure.

In embodiments of the present disclosure, a method for indicating a sidelink coordinated resource is provided, including: receiving a resource coordination request from at least one requesting UE, and determining a recommended/non-recommended resource based on the resource coordination request; and transmitting information of the recommended/non-recommended resource to the at least one requesting UE, to make the at least one requesting UE acquire the recommended/non-recommended resource and determine a resource for transmitting data to another UE, wherein the information of the recommended/non-recommended resource is carried by SCI. In this manner, resources for SL communication among UEs may be coordinated to avoid communication delay or failure. The recommended/non-recommended resource refers to the recommended resource and/or the non-recommended resource.

In order to clarify the objects, characteristics and advantages of the disclosure, embodiments of present disclosure will be described in detail in conjunction with accompanying drawings.

In embodiments of the present disclosure, a method for indicating a sidelink coordinated resource is provided.

The method for indicating the sidelink coordinated resource in the embodiment may be applied in a typical V2X system which have multiple UEs at least one of which is a coordinating UE for coordinating sidelink transmission resources of surrounding UEs. When a UE has a need to perform data transmission with other UEs around, the UE may first transmit a resource coordination request to the coordinating UE to request Resource Assistance Information (RAI), i.e., information of a recommended/non-recommended resource. The UE transmitting the resource coordination request is called a requesting UE. Optionally, one or more coordinating UEs may be included in one V2X UE group to coordinate sidelink transmission resources for the group. Multiple requesting UEs may transmit a resource coordination request to one coordinating UE, and the coordinating UE transmits RAI to the requesting UEs based on identities of the requesting UEs or time when the requesting UEs need to transmit data. In addition, other UEs refer to UEs other than the requesting UEs, more specifically, may be UEs other than the requesting UEs and the coordinating UE, or in some cases may be the coordinating UE.

Figure 2:
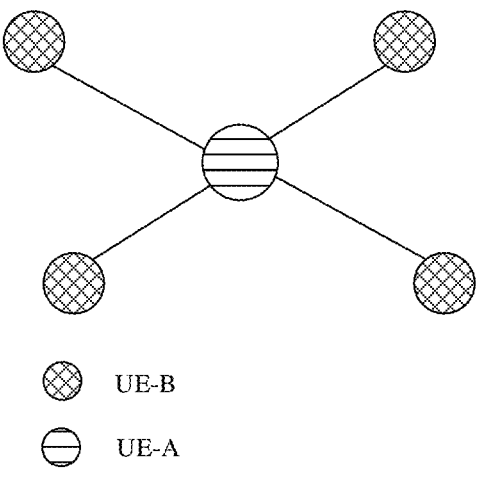
FIG. 2 is an application diagram of a method for indicating a sidelink coordinated resource according to an embodiment.

Referring to FIG. 2, FIG. 2 is an application diagram of a method for indicating a sidelink coordinated resource according to an embodiment. Multiple requesting UEs (that is, UE-B in FIG. 2) may transmit a resource coordination request to one coordinating UE (UE-A in FIG. 2).

Figure 1:
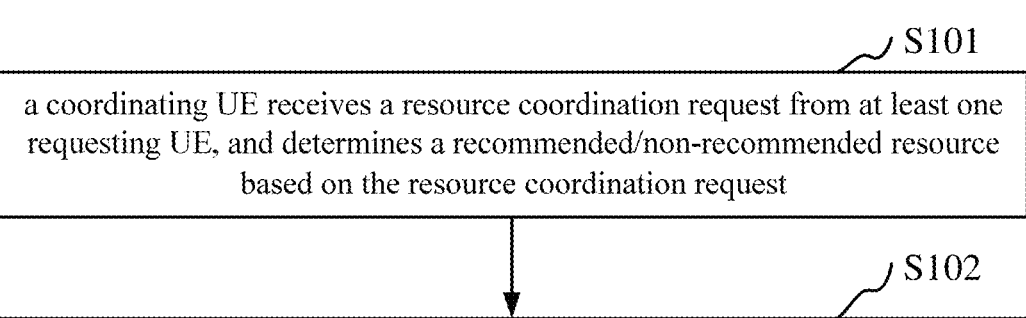
FIG. 1 is a flow chart of a method for indicating a sidelink coordinated resource according to an embodiment.

Referring to FIG. 1, the method includes S101 and S102.

In S101, a coordinating UE receives a resource coordination request from at least one requesting UE, and determines a recommended/non-recommended resource based on the resource coordination request.

The recommended resource is a resource that is used by the requesting UE to transmit data within a later period of time, and the non-recommended resource is a resource that cannot be used by the requesting UE to transmit data within a later period of time. A result of coordinating resources for each requesting UE by the coordinating UE is to provide the recommended/non-recommended resource for the requesting UE, to enable the requesting UE to use the recommended resource to transmit data, or to prevent the requesting UE from selecting the non-recommended resource when selecting a resource for data transmission, thereby avoiding a transmission failure.

In some embodiments, the RAI may indicate one or more Physical Resource Blocks (PRBs) in the preset resource pool as the recommended/non-recommended resource.

In a V2X system, sidelink resources for communication between UEs are acquired from a preset resource pool which includes one or more PRBs. Position information (including time domain position, frequency domain position, offset, etc.) of each PRB in the preset resource pool is consistent in the understanding of each requesting UE and coordinating UE. Optionally, the position (including time domain position, frequency domain position, offset, etc.) of each PRB in the preset resource pool is configured by high-layer signaling which may include time domain indication and frequency domain indication of PRBs in the preset resource pool. That is, the PRBs in the preset resource pool may be determined according to the two portions indicated by the high-layer signaling. Optionally, the high-layer signaling may be Radio Resource Control (RRC) signaling or broadcast signaling.

In S102, the coordinating UE transmits information of the recommended/non-recommended resource to the at least one requesting UE, to make the at least one requesting UE acquire the recommended/non-recommended resource and determine a resource for transmitting data to another UE.

The information of the recommended/non-recommended resource is carried by SCI.

The coordinating UE transmits the information of recommended/non-recommended resource (i.e., the RAI) to the requesting UE. The RAI may be carried by SCI, for example, SCI for the coordinating UE transmitting RAI to the requesting UE is added in the V2X system. Except for the difference in information carried, other definitions and implementation manners of the added SCI may refer to related designs of existing SCI.

The method in FIG. 1 is performed by the coordinating UE, which provides a sidelink resource coordination mechanism for SL transmission. The coordinating UE can provide the recommended and/or non-recommended resource for one or more requesting UEs. The requesting UE can select its own appropriate resource for data transmission with other UEs based on the recommended and/or non-recommended resource, which prevents the requesting UE from selecting an unavailable sidelink resource, thereby avoiding communication delay or failure.

In some embodiments, the SCI indicates a time domain position and/or a frequency domain position of the recommended/non-recommended resource in a preset resource pool.

The recommended/non-recommended resource indicated in the SCI is one or more PRBs in the preset resource pool, and the time domain position/frequency domain position of the recommended/non-recommended resource is a time domain position/frequency domain position of the PRB in the preset resource pool.

The SCI may merely indicate the time domain position of the recommended/non-recommended resource in the preset resource pool, or merely indicate the frequency domain position of the recommended/non-recommended resource in the preset resource pool, or indicate both the time domain position and the frequency domain position of the recommended/non-recommended resource in the preset resource pool.

When the SCI indicates both the time domain position and the frequency domain position, a data field of the SCI is divided into a time domain indication field and a frequency domain indication field, and the requesting UE may decode them respectively. Specifically, the time domain position of the recommended/non-recommended resource is acquired from the time domain indication field, and the frequency domain position of the recommended/non-recommended resource is acquired from the frequency domain indication field.

In some embodiments, the requesting UE can respectively decode the time domain position and the frequency domain position of the recommended/non-recommended resource indicated by the SCI, so as to determine the recommended/non-recommended resource.

In some embodiments, the recommended/non-recommended resource is located in a time domain window which is a period of time obtained by dividing time domain positions of available resources.

The available resources are resources available for each requesting UE to perform SL transmission, and may correspond to multiple PRBs in the preset resource pool, also referred to as available PRBs.

The available resources are divided into multiple time domain windows according to distribution of their time domain positions. A time domain span of each time domain window (also called window length of the time domain window) may be the same or different, and is configured by high-layer signaling. The coordinating UE and the requesting UE are consistent in understanding of the time domain window and its window length. The SCI indicates the time domain window where the recommended/non-recommended resource is located and a relative time domain position of the recommended/non-recommended resource within the time domain window.

In some embodiments, the recommended/non-recommended resource determined by the coordinating UE for each requesting UE is located in a same time domain window, so that the recommended or non-recommended resource for each requesting UE is relatively separated and may not interfere with each other. In addition, the SCI indicates that the time domain position of the recommended/non-recommended resource is within a time domain window, which may effectively save signaling overhead. Specifically, the smaller the window length of the configured time domain window is, the lower the signaling overhead is.

A logical slot of an available PRB is called an available logical slot, and time domain granularity indicated by the SCI is an integer multiple of the available logical slot.

In some embodiments, a number of bits in the time domain indication field of the SCI is determined by the window length of the time domain window.

Figure 3:
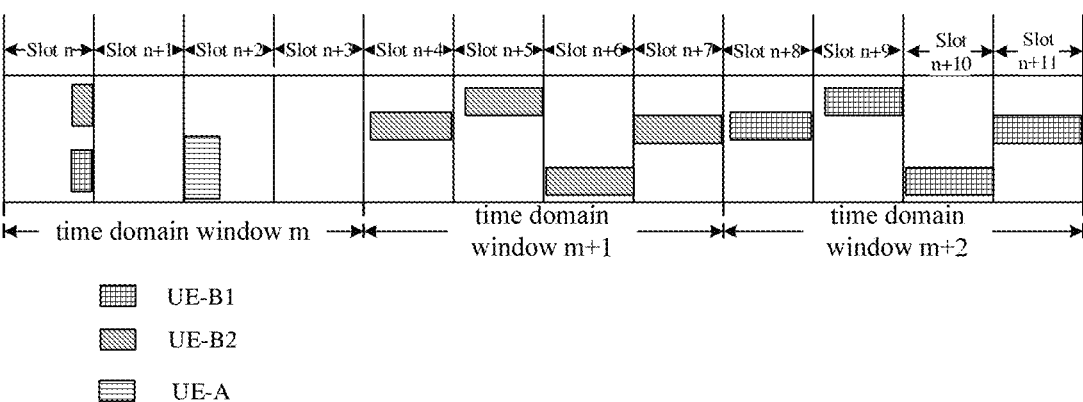
FIG. 3 is a time domain diagram of a method for indicating a sidelink coordinated resource according to an embodiment.

Referring to FIG. 3. FIG. 3 is a time domain diagram of a method for indicating a sidelink coordinated resource according to an embodiment. Logical time slots of available PRBs in the preset resource pool correspond to Slot n, Slot n+1, . . . , Slot n+11 in FIG. 3. This portion is divided into multiple time domain windows (for example, three time windows in FIG. 3 including time domain window m, time domain window m+1, and time domain window m+2), and each time domain window includes multiple slots (for example, each time window in FIG. 3 includes 4 slots). The recommended resource and the non-recommended resource allocated by the coordinating UE (i.e., UE-A in FIG. 3) are all in the same time domain window. In FIG. 3, UE-B1 and UE-B2 transmit resource coordination requests to UE-A in slot n, and UE-A returns RAI to UE-B1 and UE-B2 in slot n+2, where the RAI indicates that both the recommended resource and the non-recommended resource of UE-B2 are within the time domain window m+1, and both the recommended resource and the non-recommended resource of UE-B1 are within the time domain window m+2.

In some embodiments, the high-layer signaling divides an available channel into several subchannels according to frequency, and the subchannel is frequency domain granularity of available resources, and frequency domain granularity indicated by the SCI is an integer multiple of the subchannel.

In some embodiments, the subchannel may correspond to a frequency domain positions of the preset resource pool, which correspondence is indicated by high-layer signaling.

In some embodiments, a number of bits in the frequency domain indication field of the SCI is determined by the frequency domain granularity and the preset resource pool.

In some embodiments, the time domain granularity and the frequency domain granularity indicated by the SCI are configured by high-layer signaling.

In some embodiments, the information of the recommended/non-recommended resource further includes a priority of the recommended/non-recommended resource.

If the recommended resource or the non-recommended resource is a plurality of resource blocks, the priority of the recommended or non-recommended resource indicates a degree of recommendation or non-recommendation of each PRB by the coordinating UE. Accordingly, after receiving the SCI, the requesting UE may first select the recommended resource with the highest priority or filter out the non-recommended resource with the highest priority.

In some embodiments, the SCI also indicates the priority of recommended/non-recommended resource, so that the UE can select an appropriate resource to transmit data from multiple recommended/non-recommended resource blocks.

In some embodiments, said transmitting information of the recommended/non-recommended resource to the at least one requesting UE includes: transmitting information of the recommended/non-recommended resource corresponding to a plurality of requesting UEs using a same PSCCH.

The coordinating UE may use the same PSCCH to transmit SCI carrying the information of the recommended/non-recommended resource to multiple requesting UEs. In this case, the multiple requesting UEs need to monitor the PSCCH to receive the SCI carrying the information of the recommended/non-recommended resource.

In some embodiments, the information of the recommended/non-recommended resource corresponding to multiple requesting UEs may be carried in the same SCI. In this case, each requesting UE needs to decode the SCI of the PSCCH to determine whether the SCI carries the information of the recommended/non-recommended resource it needs.

In some embodiments, the information of the recommended/non-recommended resource corresponding to multiple requesting UEs may be carried in different SCI, and multiple requesting UEs monitor the PSCCH. If the SCI carrying the information of the recommended/non-recommended resource is monitored, each requesting UE identifies whether the SCI is its own SCI; if yes, the requesting UE decodes the SCI to acquire the information of the recommended/non-recommended resource; or if no, the requesting UE does not decode the SCI.

In some embodiments, the SCI carrying the information of the recommended/non-recommended resource also carries identities of the plurality of requesting UEs, to make the plurality of requesting UEs identify corresponding SCI based on the identities.

The Identity (ID) of the requesting UE carried by the SCI is also called destination ID, which may be generated for a physical layer ID or an intra-group ID of the requesting UE.

In some embodiments, the coordinating UE uses different PSCCHs to transmit the SCI corresponding to each requesting UE, thereby saving channel resources. However, this solution may cause conflicts among multiple requesting UEs.

In some embodiments, the coordinating UE uses different PSCCHs to transmit the SCI corresponding to each requesting UE.

In some embodiments, the SCI carries identities of the requesting UEs, to make each requesting UE identify its corresponding SCI according to the identity.

Each requesting UE has its own PSCCH, and each requesting UE can identify whether it is its own SCI according to the destination ID carried in the PSCCH, and decode the SCI if it is its own SCI.

In some embodiments, conflicts between requesting UEs may be effectively avoided.

In some embodiments, the SCI includes an identification portion and an indication portion, the identification portion indicates that the SCI carries the information of the recommended/non-recommended resource, and the indication portion carries the information of the recommended/non-recommended resource.

That is, some bits in the SCI carrying the information of recommended/non-recommended resource are used as the identification portion, so that after decoding the identification portion, the requesting UE can decode the information of the recommended/non-recommended resource based on a coding rule of the SCI carrying the information of recommended/non-recommended resource.

The identification portion may include several bits preset in the SCI, and these bits may be set to a preset value (for example, all 1 or all 0), and when the requesting UE decodes to obtain the preset value at these bits, the requesting UE knows that the SCI carries the RAI.

In some embodiments, the SCI is in a 1-A format and includes a first-stage SCI for scheduling PSSCH, and the identification portion includes a bit field corresponding to frequency domain resource assignment in the first-stage SCI.

In this case, the SCI is SCI format 1-A, and the first-stage SCI is used to schedule a PSSCH and a second-stage SCI (that is, 2nd-stage-SCI) on the PSSCH. More specific designs of SCI format 1-A can be referred to Release 16 (also referred to as R16).

The frequency domain resource assignment field in the first stage SCI format 1-A is configured as the identification portion, for example, when the frequency domain resource assignment field is all 1, the SCI carries the RAI.

In some embodiments, the SCI further includes the second-stage SCI, and the indication portion includes a bit field corresponding to time domain resource assignment in the first-stage SCI and at least one of bit fields corresponding to a Beta offset indicator, a number of DMRS ports, and a modulation and coding scheme in the second-stage SCI.

Other portions of the data field of the first stage SCI format 1-A (such as the time domain resource assignment field) can serve as the indication portion to carry the information of the recommended/non-recommended resource.

If the above-mentioned bit fields are used to carry the information of the recommended/non-recommended resource, other bit fields in the first-stage SCI, such as a priority, a resource reservation period, a DMRS pattern, may follow designs of existing SCI.

In some embodiments, bit fields in the second-stage SCI, such as a Beta offset indicator, a number of DMRS ports, and a modulation and coding scheme, can be used to carry the information of the recommended/non-recommended resource.

Other bit fields that do not carry the information of the recommended/non-recommended resource, such as a Modulation and Coding Scheme (MCS) table indicator, may following designs of the existing SCI.

In some embodiments, the information of the recommended/non-recommended resource is carried by at least one of bit fields corresponding to a HARQ process ID, a new data indicator, a redundancy version, a source ID a destination ID, a zone ID, and a communication range requirement.

Alternatively, the SCI carrying the RAI may be in 2-A or 2-B format, which is referred to as SCI format 2-A and SCI format 2-B.

SCI format 2-A is used for decoding PSSCH, and response signaling corresponding to its HARQ operation may include ACK for transmission acknowledgement and NACK for transmission failure. Alternatively, no reply is made when transmission fails.

SCI format 2-B is used for decoding PSSCH, and response signaling corresponding to its HARQ operation merely includes NACK for transmission failure.

When the SCI carrying the RAI is SCI format 2-A, bit fields, such as the HARQ process ID, the new data indicator, the redundancy version, the source ID, the destination ID, and the CSI request, can be used to carry the information of the recommended/non-recommended resource.

When the SCI carrying the RAI is SCI format 2-B, bit fields, such as the HARQ process ID, the new data indicator, the redundancy version, the source ID, the destination ID, the zone ID and the communication range requirement, can be used to carry the information of the recommended/non-recommended resource.

Specific designs of SCI format 2-A and SCI format 2-B can be referred to relevant descriptions in Release 16.

Figure 4:
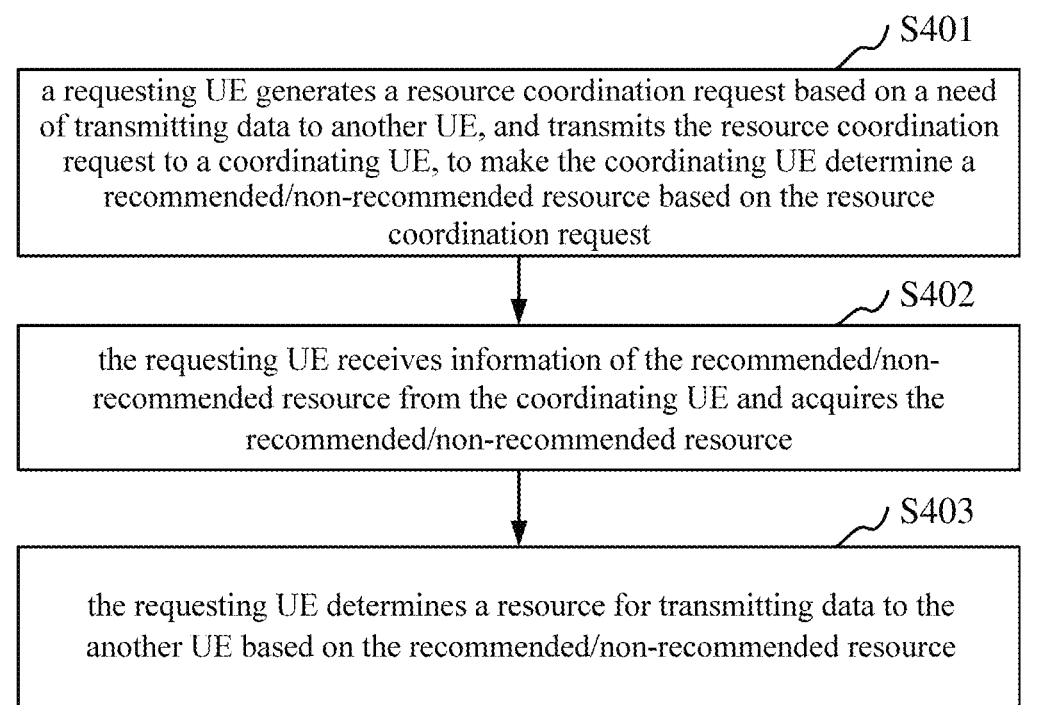
FIG. 4 is a flow chart of a method for indicating a sidelink coordinated resource according to an embodiment.

Referring to FIG. 4, FIG. 4 is a flow chart of a method for indicating a sidelink coordinated resource according to an embodiment. The method may include S401, S402 and S403.

In S401, a requesting UE generates a resource coordination request based on a need of transmitting data to another UE, and transmits the resource coordination request to a coordinating UE, to make the coordinating UE determine a recommended/non-recommended resource based on the resource coordination request.

In S402, the requesting UE receives information of the recommended/non-recommended resource from the coordinating UE and acquires the recommended/non-recommended resource.

In S403, the requesting UE determines a resource for transmitting data to the another UE based on the recommended/non-recommended resource.

The information of the recommended/non-recommended resource is carried by SCI.

In some embodiments, said acquiring the recommended/non-recommended resource includes: acquiring a time domain position and/or a frequency domain position of the recommended/non-recommended resource in a preset resource pool based on the information of the recommended/non-recommended resource.

In some embodiments, the recommended/non-recommended resource is located in a time domain window which is a period of time obtained by dividing time domain positions of available resources.

In some embodiments, the information of the recommended/non-recommended resource further includes a priority of the recommended/non-recommended resource.

In some embodiments, a plurality of requesting UEs monitors a same PSCCH to acquire corresponding information of the recommended/non-recommended resource.

In some embodiments, said receiving information of the recommended/non-recommended resource from the coordinating UE includes: monitoring a corresponding PSCCH to receive the SCI.

In some embodiments, the SCI carries identities of the plurality of requesting UEs, and following receiving the SCI, the method further includes: identifying whether the SCI received by a first requesting UE is SCI corresponding to the first requesting UE based on the identities of the plurality of requesting UEs carried in the SCI.

In some embodiments, the SCI includes an identification portion and an indication portion, and the method further includes: identifying based on the identification portion that the SCI carries the information of the recommended/non-recommended resource; and acquiring based on the indication portion the information of the recommended/non-recommended resource.

In some embodiments, the SCI is in a 1-A format and includes a first-stage SCI, and the identification portion includes a bit field corresponding to frequency domain resource assignment in the first-stage SCI.

In some embodiments, the SCI further includes a second-stage SCI, and the indication portion includes a bit field corresponding to time domain resource assignment in the first-stage SCI and at least one of bit fields corresponding to a Beta offset indicator, a number of DMRS ports, and a modulation and coding scheme in the second-stage SCI.

In some embodiments, the information of the recommended/non-recommended resource is carried by at least one of bit fields corresponding to a HARQ process ID, a new data indicator, a redundancy version, a source ID, a destination ID, a zone ID, and a communication range requirement.

Principles, specific implementation manners and advantages of the method as shown in FIG. 4 can be referred to related descriptions of the requesting UE (or UE-B) in the method as shown in FIGS. 1 to 3, and are not repeated here.

Figure 5:
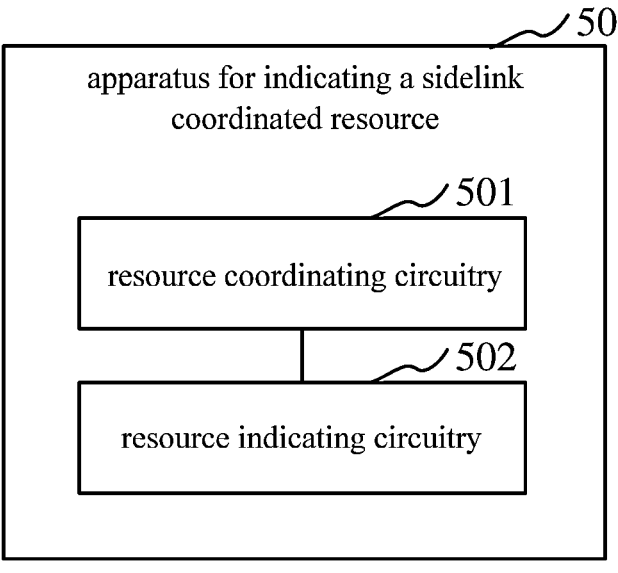
FIG. 5 is a structural diagram of an apparatus for indicating a sidelink coordinated resource according to an embodiment.

FIG. 5 is a structural diagram of an apparatus for indicating a sidelink coordinated resource according to an embodiment. Referring to FIG. 5, the apparatus 50 includes a resource coordinating circuitry 501 and a resource indicating circuitry 502.

The resource coordinating circuitry 501 is configured to receive a resource coordination request from at least one requesting UE, and determine a recommended/non-recommended resource based on the resource coordination request. The resource indicating circuitry 502 is configured to transmit information of the recommended/non-recommended resource to the at least one requesting UE, to make the at least one requesting UE acquire the recommended/non-recommended resource and determine a resource for transmitting data to another UE.

The information of the recommended/non-recommended resource is carried by SCI.

Principles, specific implementation manners and advantages of the apparatus 50 can be referred to related descriptions of the method as shown in FIGS. 1 to 3, and are not repeated here.

In some embodiments, the apparatus 50 may correspond to a chip with a function for requesting a sidelink coordinated resource in a UE, or to a chip with a data processing function, such as a System-On-Chip (SOC) or a baseband chip, or to a chip module including a chip with a function for requesting a sidelink coordinated resource in the UE, or to a chip module including a chip with a data processing function, or to the UE.

Figure 6:
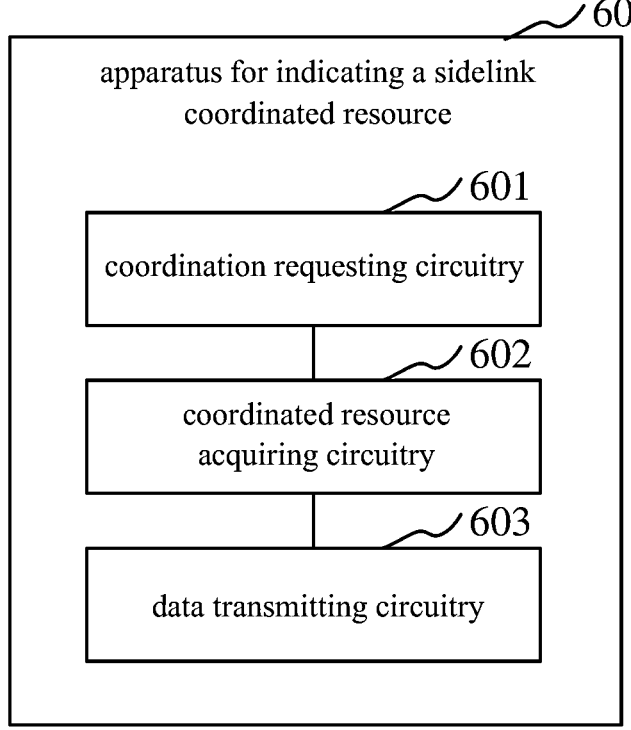
FIG. 6 is a structural diagram of an apparatus for indicating sidelink coordinated resource according to an embodiment.

FIG. 6 is a structural diagram of an apparatus for indicating a sidelink coordinated resource according to an embodiment. Referring to FIG. 6, the apparatus 60 includes a coordination requesting circuitry 601, a coordinated resource acquiring circuitry 602 and a data transmitting circuitry 603.

The coordination requesting circuitry 601 is configured to generate a resource coordination request based on a need of transmitting data to another UE, and transmit the resource coordination request to a coordinating UE, to make the coordinating UE determine a recommended/non-recommended resource based on the resource coordination request. The coordinated resource acquiring circuitry 602 is configured to receive information of the recommended/non-recommended resource from the coordinating UE and acquire the recommended/non-recommended resource. The data transmitting circuitry 603 is configured to determine a resource for transmitting data to the another UE based on the recommended/non-recommended resource.

The information of the recommended/non-recommended resource is carried by SCI.

Principles, specific implementation manners and advantages of the apparatus 60 can be referred to related descriptions of the method as shown in FIG. 4, and are not repeated here.

In some embodiments, the apparatus 60 may correspond to a chip with a function for requesting a sidelink coordinated resource in a UE, or to a chip with a data processing function, such as an SOC or a baseband chip, or to a chip module including a chip with a function for requesting a sidelink coordinated resource in the UE, or to a chip module including a chip with a data processing function, or to the UE.

In some embodiments, each module/unit of each apparatus and product described in the above embodiments may be a software module/unit or a hardware module/unit, or may be a software module/unit in part, and a hardware module/unit in part.

For example, for each apparatus or product applied to or integrated in a chip, each module/unit included therein may be implemented by hardware such as circuits; or, at least some modules/units may be implemented by a software program running on a processor integrated inside the chip, and the remaining (if any) part of the modules/units may be implemented by hardware such as circuits. For each apparatus or product applied to or integrated in a chip module, each module/unit included therein may be implemented by hardware such as circuits. Different modules/units may be disposed in a same component (such as a chip or a circuit module) or in different components of the chip module. Or at least some modules/units may be implemented by a software program running on a processor integrated inside the chip module, and the remaining (if any) part of the modules/units may be implemented by hardware such as circuits. For each apparatus or product applied to or integrated in a terminal, each module/unit included therein may be implemented by hardware such as circuits. Different modules/units may be disposed in a same component (such as a chip or a circuit module) or in different components of the terminal. Or at least some modules/units may be implemented by a software program running on a processor integrated inside the terminal, and the remaining (if any) part of the modules/units may be implemented by hardware such as circuits.

In an embodiment of the present disclosure, a storage medium having computer instructions stored therein is provided, wherein when the computer instructions are executed, the above method as shown in FIGS. 1 to 3 or the above method as shown in FIG. 4 is performed. In some embodiments, the storage medium may be a computer readable storage medium, and may include a non-volatile or a non-transitory memory, or include an optical disk, a magnetic disk or a solid disk.

In an embodiment of the present disclosure, a terminal including the apparatus as shown in FIG. 5 or 6 or including a memory and a processor is provided, wherein the memory has computer instructions stored therein, and when the processor executes the computer instructions, the above method as shown in FIGS. 1 to 3 or the above method as shown in FIG. 4 is performed. The terminal may include but not limited to a mobile phone, a computer or a tablet computer.

In the embodiments of the present disclosure, a core network may be an Evolved Packet Core (EPC), 5G Core Network or a new core network in future communication systems. The 5G Core Network is composed of a set of devices, implements Access and Mobility Management Function (AMF) providing functions such as mobility management function, User Plane Function (UPF) providing functions such as packet routing and forwarding and Quality of Service (QoS) management, and Session Management Function (SMF) providing functions such as session management and IP address allocation and management.

The base station in the embodiments of the present disclosure may also be referred to as a base station equipment, and is a device deployed in a Radio Access Network (RAN) to provide radio communication functions. For example, an equipment that provides a base station function in a 2G network includes a Base Transceiver Station (BTS). An equipment that provides the base station function in a 3G network includes a Node B. An equipment that provides the base station function in a 4G network includes an evolved node B (eNB). In a Wireless Local Area Network (WLAN), an equipment that provides the base station function is an Access Point (AP). An equipment that provides the base station function in a 5G New Radio (NR) includes gNB and a continuously evolved Node B (ng-eNB), where gNB and the terminal use NR technology for communication, ng-eNB and the terminal use Evolved Universal Terrestrial Radio Access (E-UTRA) technology for communication, and both gNB and ng-eNB can be connected to a 5G core network. And the base station also refers to an equipment that provides the base station function in a new communication system in the future.

The network in the embodiments of the present disclosure refers to a communication network that provides communication services for terminals, including a base station of a radio access network, a base station controller of a radio access network, and a device on a core network side.

A terminal in the embodiments of the present disclosure may refer to various forms of UE, access terminal, user unit, user station, Mobile Station (MS), remote station, remote terminal, mobile equipment, user terminal, terminal equipment, wireless communication equipment, user agent or user device. The terminal equipment may further be a cellular phone, a cordless phone, a Session Initiation Protocol (SIP) phone, a Wireless Local Loop (WLL) station, a Personal Digital Assistant (PDA), a handheld device with a wireless communication function, a computing device or other processing devices connected to a wireless modems, an in-vehicle device, a wearable device, a terminal equipment in the future 5G network, or a terminal equipment in a future evolved Public Land Mobile Network (PLMN), which is not limited in the embodiments of the present disclosure.

In the embodiments of the present disclosure, a unidirectional communication link from an access network to a terminal as a downlink, data transmitted on the downlink is downlink data, and a transmission direction of the downlink data is called a downlink direction. A unidirectional communication link from a terminal to an access network is an uplink, data transmitted on the uplink is uplink data, and a transmission direction of the uplink data is an uplink direction.

It should be understood that the term "and/or" in the present disclosure is merely an association relationship describing associated objects, indicating that there can be three types of relationships, for example, A and/or B can represent "A exists only, both A and B exist, B exists only. In addition, the character "/" in the present disclosure represents that the former and latter associated objects have an "or" relationship.

The "plurality" in the embodiments of the present disclosure refers to two or more.

The descriptions of the first, second, etc. in the embodiments of the present disclosure are merely for illustrating and differentiating the objects, and do not represent the order or the particular limitation of the number of devices in the embodiments of the present disclosure, which do not constitute any limitation to the embodiments of the present disclosure.

The "connection" in the embodiments of the present disclosure refers to various connection ways such as direct connection or indirect connection to realize communication between devices, which is not limited in the embodiments of the present disclosure.

In the embodiments of the present disclosure, the processor may be a Central Processing Unit (CPU), or other general processors, Digital Signal Processors (DSPs), Application Specific Integrated Circuits (ASICs), Field Programmable Gate Arrays (FPGAs) or other Programmable logic devices, discrete gates or transistor logic devices, discrete hardware components, and the like. A general processor may be a microprocessor or the processor may be any conventional processor or the like.

It should also be understood that the memory in the embodiments of the present disclosure may be either volatile memory or nonvolatile memory, or may include both volatile and nonvolatile memories. The non-volatile memory may be a Read-Only Memory (ROM), a Programmable ROM (PROM), an Erasable PROM (EPROM), an electrically Erasable EPROM (EEPROM), or a flash memory. The volatile memory may be a Random Access Memory (RAM) which functions as an external cache. By way of example but not limitation, various forms of RAM are available, such as Static Random Access Memory (SRAM), Dynamic Random Access Memory (DRAM), Synchronous Dynamic Random Access Memory (SDRAM), Double Data Rate Synchronous Dynamic Random Access Memory (DDR SDRAM), Enhanced SDRAM (ESDRAM), Synchronous connection to DRAM (SLDRAM), and Direct Rambus RAM (DR-RAM).

The above embodiments may be implemented in whole or in part by software, hardware, firmware or any combination thereof. When implemented in software, the above embodiments may be implemented in whole or in part in the form of a computer program product. The computer program product includes one or more computer instructions or computer programs. The procedures or functions according to the embodiments of the present disclosure are wholly or partially generated when the computer instructions or the computer programs are loaded or executed on a computer. The computer may be a general purpose computer, a special purpose computer, a computer network, or other programmable device. The computer instructions may be stored in a computer readable storage medium or transmitted from one computer readable storage medium to another computer readable storage medium, for example, the computer instructions may be transmitted from one web site, computer, server or data center to another web site, computer, server or data center by wire (e.g., infrared, wireless, microwave and etc.). The computer readable storage medium may be any available medium that can be accessed by a computer or a data storage device such as a server or a data center that contains one or more sets of available media. The available medium may be a magnetic medium (e.g., floppy disk, hard disk or magnetic tape), an optical medium (e.g., DVD), or a semiconductor medium. The semiconductor medium may be a solid disk.

It should be understood that, in the various embodiments of the present disclosure, sequence numbers of the above-mentioned processes do not represent an execution sequence, and the execution sequence of each process should be determined by its function and inherent logic, which does not limit an implementation process of the embodiments of the present disclosure.

In the above embodiments of the present disclosure, it should be understood that the disclosed method, device and system may be implemented in other ways. For example, the above device embodiments are merely illustrative, and for example, division of units is merely one logical division, and other divisions may be realized in practice, for example, a plurality of units or components may be combined or integrated into another system, or some features may be omitted, or not executed. Further, the shown or discussed mutual coupling or direct coupling or communication connection may be an indirect coupling or communication connection via some interfaces, devices or units, and may be in an electrical, mechanical or other form.

The units described as separate parts may or may not be physically separate, and parts shown as units may or may not be physical units, that is, may be disposed in one place, or may be distributed on a plurality of network units. Some or all of the units can be selected according to practical requirements to achieve the purpose of the solutions of the embodiments.

In addition, functional units in the embodiments of the present disclosure may be integrated in one processing unit, or each unit may be physically separate, or two or more units may be integrated in one unit. The integrated units can be realized in a form of hardware, or in a form of hardware plus a software functional unit.

The integrated units implemented in the form of the software functional unit may be stored in a computer readable storage medium. The software functional unit is stored in a storage medium and includes several instructions for causing a computer device (a personal computer, a server or a network device) to execute some steps of the methods in the embodiments of the present disclosure. And the storage medium may be a medium for storing program codes, such as a U disk, a removable hard disk, a ROM, a RAM, a magnetic disk or an optical disk.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for indicating a sidelink coordinated resource, comprising:

receiving a resource coordination request from a requesting User Equipment (UE), wherein the resource coordination request is used to request a recommended resource or a non-recommended resource;

determining a resource based on the resource coordination request; and transmitting information of the resource to the requesting UE;

wherein the information of the resource is carried by Sidelink Control Information (SCI);

the SCI comprises time domain position and frequency domain position of the resource; and the SCI comprises an identification portion which indicates that the resource is the recommended resource or the non-recommended resource.

2. The method according to claim 1, wherein the resource is located in a time domain window which is a period of time obtained by dividing time domain positions of available resources in a preset resource pool.

3. The method according to claim 1, wherein frequency domain granularity indicated by the SCI is an integer multiple of a subchannel, and the subchannel is frequency domain granularity of available resources and obtained by high-layer signaling dividing an available channel according to frequency.

4. The method according to claim 3, wherein a number of bits in a frequency domain indication field of the SCI is determined by the frequency domain granularity and a preset resource pool.

5. The method according to claim 1, wherein the SCI carries an identity of the requesting UE.

6. The method according to claim 1, wherein the SCI further comprises an indication portion which carries the information of the resource.

7. The method according to claim 1, wherein the identification portion comprises several bits preset in the SCI which are set to a preset value.

8. The method according to claim 7, wherein in response to decoding to obtain the preset value at these bits, the requesting UE determines that the SCI carries Resource Assistance Information (RAI).

9. A non-transitory storage medium storing one or more programs, the one or more programs comprising computer instructions, which, when executed by a processor, cause the processor to:

receive a resource coordination request from a requesting User Equipment (UE), wherein the resource coordination request is used to request a recommended resource or a non-recommended resource;

determine a resource based on the resource coordination request; and transmit information of the resource to the requesting UE;

wherein the information of the resource is carried by Sidelink Control Information (SCI);

the SCI comprises time domain position and frequency domain position of the resource; and the SCI comprises an identification portion which indicates that the resource is the recommended resource or the non-recommended resource.

10. A terminal comprising a memory and a processor, wherein the memory stores one or more programs, the one or more programs comprising computer instructions, which, when executed by the processor, cause the processor to:

receive a resource coordination request from a requesting User Equipment (UE), wherein the resource coordination request is used to request a recommended resource or a non-recommended resource;

determine a resource based on the resource coordination request; and transmit information of the resource to the requesting UE;

wherein the information of the resource is carried by Sidelink Control Information (SCI);

the SCI comprises time domain position and frequency domain position of the resource; and the SCI comprises an identification portion which indicates that the resource is the recommended resource or the non-recommended resource.

11. The terminal according to claim 10, wherein the resource is located in a time domain window which is a period of time obtained by dividing time domain positions of available resources in a preset resource pool.

12. The terminal according to claim 10, wherein frequency domain granularity indicated by the SCI is an integer multiple of a subchannel, and the subchannel is frequency domain granularity of available resources and obtained by high-layer signaling dividing an available channel according to frequency.

13. The terminal according to claim 12, wherein a number of bits in a frequency domain indication field of the SCI is determined by the frequency domain granularity and a preset resource pool.

14. The terminal according to claim 10, wherein the SCI carries an identity of the requesting UE.

15. The terminal according to claim 10, wherein the SCI further comprises an indication portion which carries the information of the resource.

16. The terminal according to claim 10, wherein the identification portion comprises several bits preset in the SCI which are set to a preset value.

17. The terminal according to claim 16, wherein in response to decoding to obtain the preset value at these bits, the requesting UE determines that the SCI carries Resource Assistance Information (RAI).

* * * * *